(12) United States Patent  
Miyashita et al.

(10) Patent No.: US 6,619,274 B2
(45) Date of Patent: Sep. 16, 2003

(54) OUTBOARD ENGINE INTAKE AIR COOLING SYSTEM

(75) Inventors: Yasushi Miyashita, Shizuoka-ken (JP); Jiro Saiga, Shizuoka-ken (JP); Katsuhiro Fukuda, Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 10/238,851

(22) Filed: Sep. 11, 2002

(65) Prior Publication Data

US 2003/0066517 A1 Apr. 10, 2003

(30) Foreign Application Priority Data

Sep. 12, 2001 (JP) .................................... 2001-276836

(51) Int. Cl.⁷ .................................................. F01P 3/02
(52) U.S. Cl. ............................... 123/542; 123/196 AB
(58) Field of Search ......................... 123/542, 196 AB

(56) References Cited

U.S. PATENT DOCUMENTS 4,565,175 A * 1/1986 Kaye ........................ 123/542
5,394,854 A * 3/1995 Edmaier et al. ............ 123/542
5,967,112 A * 10/1999 Haga et al. ............ 123/196 AB
6,006,730 A * 12/1999 Rutke et al. ............... 123/542
6,182,643 B1 * 2/2001 Canopy ...................... 123/542
6,360,702 B1 * 3/2002 Osada ................... 123/196 AB

FOREIGN PATENT DOCUMENTS

| JP | 06-123225 | 5/1994 |
| JP | 06-123228 | 5/1994 |
| JP | 07-305631 A | 11/1995 |

* cited by examiner

Primary Examiner—Marguerite McMahon
(74) Attorney, Agent, or Firm—Finnegan, Henderson, Farabow, Garrett & Dunner, L.L.P.

(57) ABSTRACT

An air intake cooling system for an outboard motor equipped with a V-type engine. In one embodiment, the air intake cooling system has an air intake manifold and a water-cooling passageway positioned in the air intake manifold for cooling air in the air intake manifold. The system further has a water sleeve for cooling a main oil reservoir located inside the V-type engine, the water sleeve positioned next to the main oil reservoir and connected to the water-cooling passageway. The system uses water in the water-cooling passageway for cooling the air intake manifold and in the water sleeve for cooling a lubricating oil in the main oil reservoir, the water used to cool the intake manifold being the same as the water in the water sleeve.

6 Claims, 6 Drawing Sheets

OUTBOARD ENGINE INTAKE AIR COOLING SYSTEM

DESCRIPTION OF THE INVENTION

1. Field of the Invention

This invention relates to an intake cooling system for an outboard motor equipped with a V-type engine.

2. Background of the Invention

Outboard motor engines get extremely hot during operation due to the heat generated by the engine and the trapping of the heat by the engine cover. This heat buildup decreases the air intake efficiency of the intake passageways. By equipping the engines with an intake cooling system that prevents a temperature increase in the intake manifold, the intake filling efficiency is improved and the engine output is increased.

For example, intake cooling systems have been described before, in Japanese patent applications (Kokai H6-123225 and Japan Kokai H6-123228), as intake cooling systems for an outboard motor equipped with a four-cycle engine. Both of the aforementioned applications address intake cooling systems of outboard motors that have engines with cylinders arranged in line, and therefore are not adaptable to a V-type engine, which has a different arrangement of cylinders and an intake manifold.

It is accordingly a primary object of the invention to provide an intake cooling system for a V-type outboard engine. This is achieved by providing a fluid-cooling passageway exclusively for an engine intake manifold. The cooling fluid will normally be water. Thus, the preferred embodiment of the invention will be described using water as the cooling fluid. In the present invention, the primary object is achieved by providing a water cooling system having a water sleeve, using water that has cooled the intake manifold also for cooling the main oil reservoir inside the engine.

SUMMARY OF THE INVENTION

In accordance with the invention, there is an intake cooling system for use in an outboard motor equipped with a V-type engine. The V-type engine has cylinder heads, cylinder blocks, and a crankcase, and is arranged with a crankshaft that is almost perpendicular to the joint face of the crankcase and the cylinder blocks.

The cooling fluid will normally be water. Thus, the preferred embodiment of the invention will be described using water as the cooling fluid. In the present invention, the primary object is achieved by providing an intake cooling system having a water-cooling passageway positioned in an intake manifold and used for cooling the manifold. The intake cooling system also has a water sleeve for cooling a main oil reservoir located inside the engine. The water sleeve is positioned next to this main oil reservoir and uses water that has cooled the intake manifold to also cool lubricating oil in the oil resrevoir. While this embodiment uses water to cool the engine, any suitable fluid may be used. Thus, the term water and fluid are interchangeable.

In another embodiment of the present invention, the intake cooling system is used in an outboard motor equipped with a V-type engine, which has cylinder heads, cylinder blocks, and a crankcase, and forms a V-bank between left and right integral cylinder blocks (by arranging the cylinder blocks in a V-shape, as viewed from above). The outboard motor is equipped with an intake system in this V-bank and an exhaust system on the outside left and right of the V-bank while being also having the crankshaft almost perpendicular to the joint face of the crankcase and the cylinder blocks.

The intake cooling system has passageways positioned in an intake manifold. The system also has a water-cooling passageway, exclusively for use in the intake manifold, arranged in a roughly V-shaped valley and formed by bending the intake passageways toward the left and right cylinder heads, in opposite directions from each other. This embodiment further has a water sleeve for cooling lubricating oil in a main oil reservoir. The water sleeve is positioned next to this main oil reservoir, and water that has cooled the intake manifold is led to the water sleeve.

In another embodiment, the intake cooling system of a V-type engine outboard motor further includes an intake manifold thermostat that opens and closes according to the lubricating oil temperature. The thermostat is positioned upstream of the water-cooling passageway; thus, the water does not flow to the water-cooling passageway until the lubricating oil reaches a predetermined temperature.

Another embodiment of the present invention has an oil filter linked to the main oil reservoir. An intake manifold thermostat is positioned between the main oil reservoir and the oil filter.

In another embodiment of the intake cooling system of a V-type engine outboard motor the system includes a water-cooling intake hole, exclusively for the intake manifold. The water cooling intake hole is positioned near an oil passageway linking the main oil reservoir and the oil filter. In this embodiment, the water-cooling passageway extends from the water-cooling intake hole and is positioned along the oil passageway.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1:
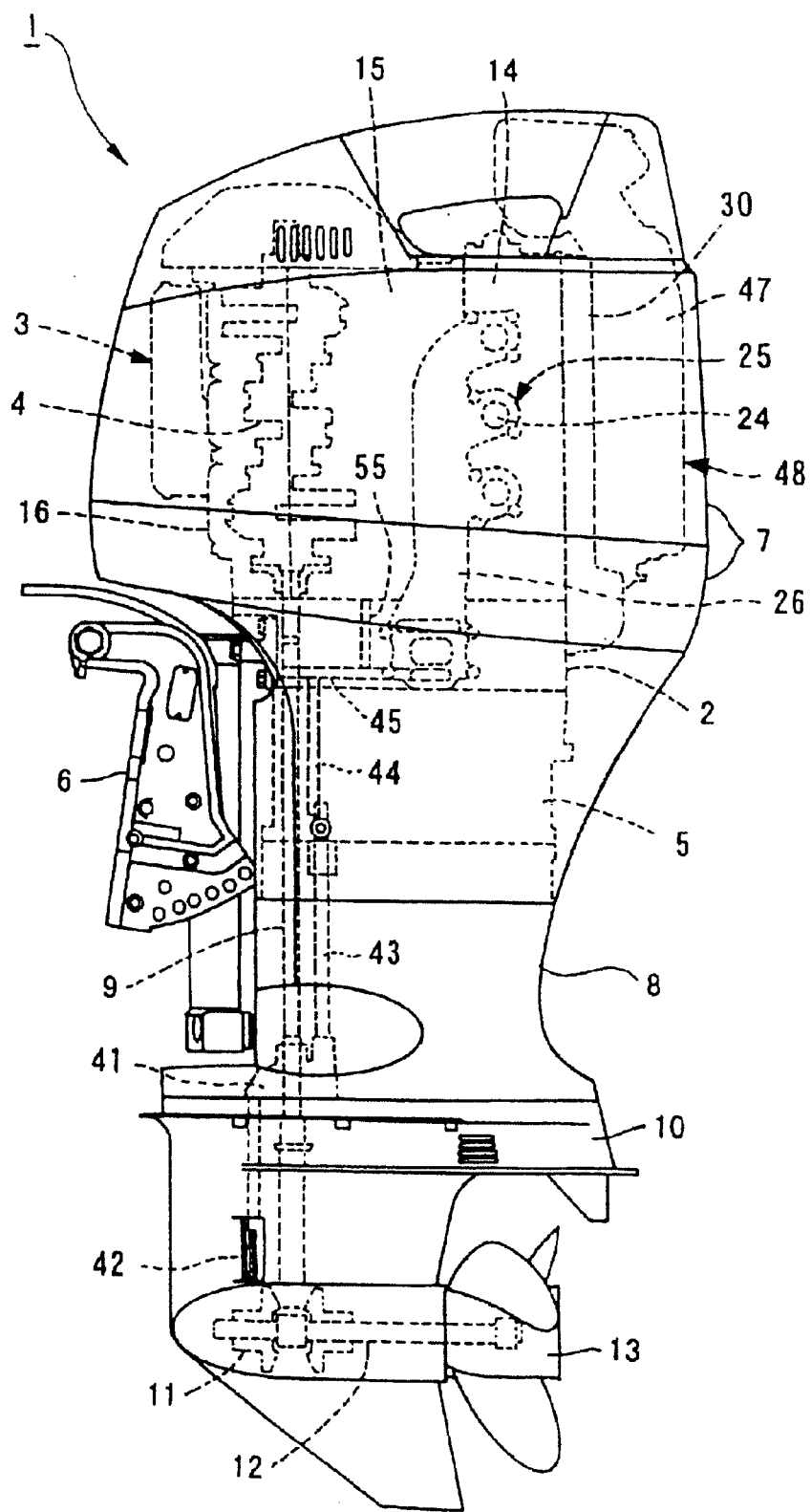
FIG. 1 is a side view of an outboard motor having an embodiment of the intake cooling system of the invention.

FIG. 1 shows a left side view of an outboard motor that has an embodiment of the intake cooling system therein. As shown in FIG. 1, outboard motor 1 is equipped with an engine holder 2, and an engine 3 is provided above engine holder 2. Moreover, engine 3 is a V-type (longitudinal) engine, with a crankshaft 4 that is almost perpendicular to engine holder 2. Motor 1 further includes an oil pan 5 for storing lubricating oil (not illustrated). Oil pan 5 is positioned below engine holder 2 and, in this example, a bracket unit 6 is mounted to outboard motor 1, and outboard motor 1 is installed on the transom of a boat (not illustrated), via bracket unit 6. Engine 3, engine holder 2, and oil pan 5 are covered by an engine cover 7.

A drive-shaft housing 8 is positioned below oil pan 5. An output drive-shaft 9 of an engine 3, is positioned almost perpendicular to engine holder 2, oil pan 5, and drive-shaft housing 8, and its upper end is connected to the lower end of crankshaft 4. Drive-shaft 9 is constructed so that it extends downward into drive-shaft housing 8 and drives a propeller 13, being a propulsion unit, via a bevel gear 11 and a propeller shaft 12 in a gear case 10, positioned below the drive-shaft housing 8.

Figure 2:
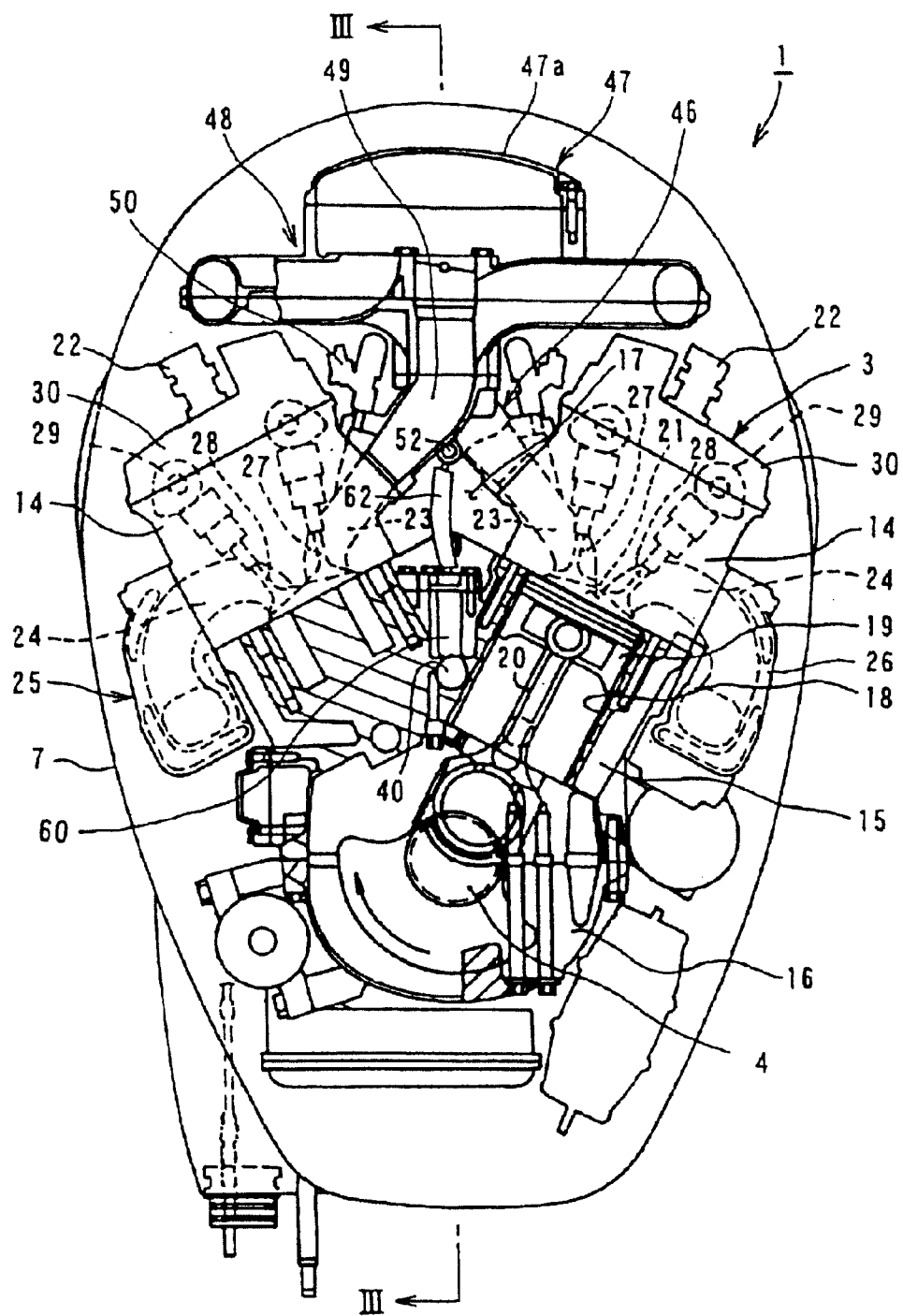
FIG. 2 is a top view of an engine having an embodiment of the intake cooling system of the invention.

FIG. 2 is a top view of engine 3 partially in cross-section, and shows a part, thereof, by cross-section. As shown in FIGS. 1 and 2, engine 3, of outboard motor 1, is a water-cooled, four-cycle, V-type, six-cylinder (multi-cylinder) engine, which is conventionally manufactured by combining, among other things, cylinder heads 14, cylinder blocks 15, and a crankcase 16. A V-bank 17 is formed between the cylinder blocks 15, by positioning the left and right cylinder blocks 15 in a V-shape, as viewed from the top.

The left and right integral cylinder blocks 15 are arranged in a V-shape, expanding in the width direction of outboard motor 1 at the rear of the crankcase 16 positioned at the left side in FIG. 1. The cylinder heads 14 are positioned at the rear of the cylinder blocks 15, respectively.

Figure 3:
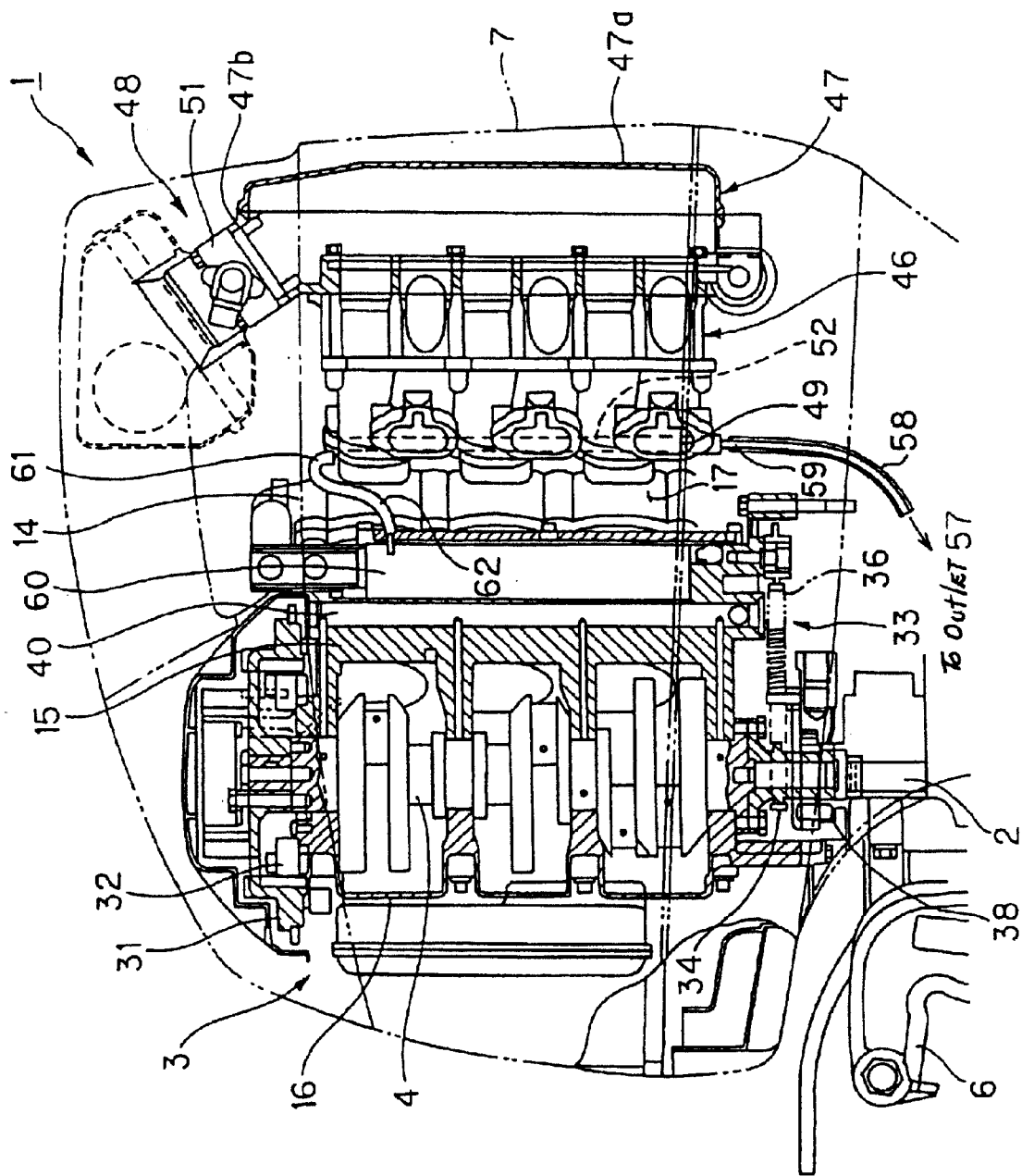
FIG. 3 is a cross-sectional view of an engine having an embodiment of the intake cooling system of the invention.
Figure 4:
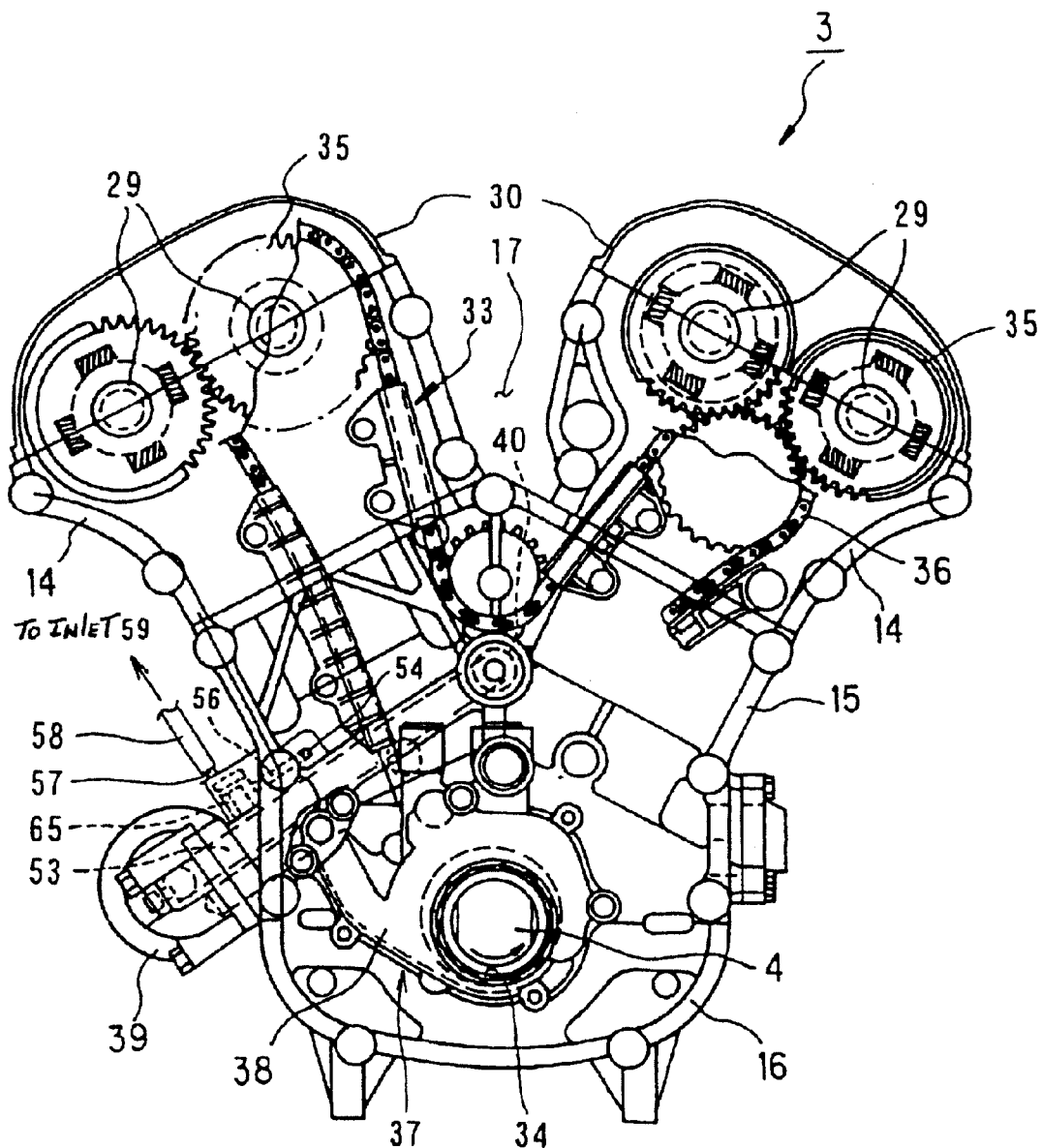
FIG. 4 is a bottom view of an engine having an embodiment of the intake cooling system of the invention.

FIG. 3 is a sectional view taken along a III—III line of FIG. 2, and FIG. 4 is the bottom view of the engine 3. Although not illustrated in detail, three by three tubular sleeves 18 (cylinders) are positioned almost horizontally in the vertical direction, side-by-side to the cylinder blocks 17, respectively. As shown in FIG. 2, pistons 19 are slid into the sleeves 18 in the axial direction on the axis of the sleeves 18.

As shown in FIGS. 2 and 3, crankshaft 4 is positioned perpendicularly to the joint face of the crankcase 16. Cylinder blocks 15, crankshaft 4, and pistons 19 are connected by connecting rods 20 to convert the reciprocating strokes of the pistons 19 into the rotating motion of crank-shaft 4.

Combustion chambers 21, matching with sleeves 18, are positioned on cylinder heads 14, respectively, and ignition plugs 22 are installed into each, respectively, from the outside. Intake ports 23 and exhaust ports 24, linking the combustion chambers 21, are also positioned in cylinder heads 14. As shown in FIG. 2, the exhaust ports 24 are connected to an exhaust passageway 26, forming an exhaust system formed on the outer side of the left and right cylinder heads 14. Intake ports 23 extend into the V-bank 17, and are positioned on the inner side of the left-right cylinder heads 14 and the cylinder blocks 15.

Moreover, intake valves 27 and exhaust valves 28 (for opening and closing ports 23 and 24 respectively) are positioned in cylinder heads 14, and two camshafts 29 (for the intake and exhaustion valves), which open and close valves 27 and 28, are positioned parallel to crankshaft 4 at the rear of cylinder heads 14, respectively. The cylinder heads 14 are covered by cylinder covers 30. Furthermore, and as shown in FIG. 3, the upper end of crankshaft 4 protrudes into engine 3, and a flywheel 31 and a magnet unit 32, for power generation, are provided at this protrusion.

As shown in FIGS. 3 and 4, a camshaft drive mechanism 33, for transmitting the rotation of crankshaft 4 to camshafts 29, is provided in the lower part of engine 3. This camshaft drive mechanism 33 is, in this example, a chain-drive model, which has a timing sprocket 34 (positioned at the lower end of crankshaft 4), cam sprockets 35 (positioned at the lower end of camshafts 29), and a timing chain 36 (wound around these sprockets 34 and 35), as its main components.

As shown in FIGS. 3 and 4, a lubricating device 37, is positioned in the lower part of engine 3. Lubricating device 37 distributes, via pressure, the lubricating oil stored in oil pan 5 to the parts of engine 3 by an oil pump 38 (positioned on the same axis as crankshaft 4), located in the lower part of the crankshaft 4. Lubricating device 37 distributes the lubricating oil through an oil filter 39 and from a main oil reservoir 40 up through and in the vertical direction in the valley of the V-bank formed by the cylinder blocks 15. The lubricating oil is finally recovered in oil pan 5 and recycled.

Moreover, as shown in FIG. 1, a water pump 41 is positioned on the surface of the gear case 10. Water pump 41 is driven by drive-shaft 9 and draws water up from the outside (sea water, lake water, river water, etc.) through an intake hole 42 on the lateral surface of gear case 10. This water is then supplied from the bottom of engine 3 up through engine 3 via a water-cooling pump 43, a first water-cooling passageway 44 (positioned inside the oil pan 5), and a second water-cooling passageway 45 located inside the engine holder 2. While this embodiment uses water to cool the engine, any suitable fluid may be used. Thus, the term water used to describe a particular fluid and certain fluid carrying components of the present invention and the term water are interchangeable.

As shown in FIGS. 1–3, an intake system 48, comprised of an intake manifold 46 and a surge-tank 47, is positioned in the rear central part of engine 3. In one embodiment, intake manifold 46 is made of an aluminum alloy and equipped with six intake passageways 49, corresponding to the number of cylinders in the engine. These intake passageways 49 link to intake ports 23 of the left and right cylinder heads 14 in descending order from the top, and a fuel injector 50 is mounted on each one of the cylinder heads 14. Fuel injectors 50 inject fuel directly into the deep part of intake ports 23.

Surge-tank 47 is a synthetic resin molding, and is formed into a single longitudinal shape, and a detachable lid 47a is positioned on its back (rear) side. A connection port 47b of a throttle body 51 (FIG. 3), is positioned in the highest part of the surge-tank 47, and intake manifold 46 is connected to the central front side of surge-tank 47, as viewed from the top.

Figure 5:
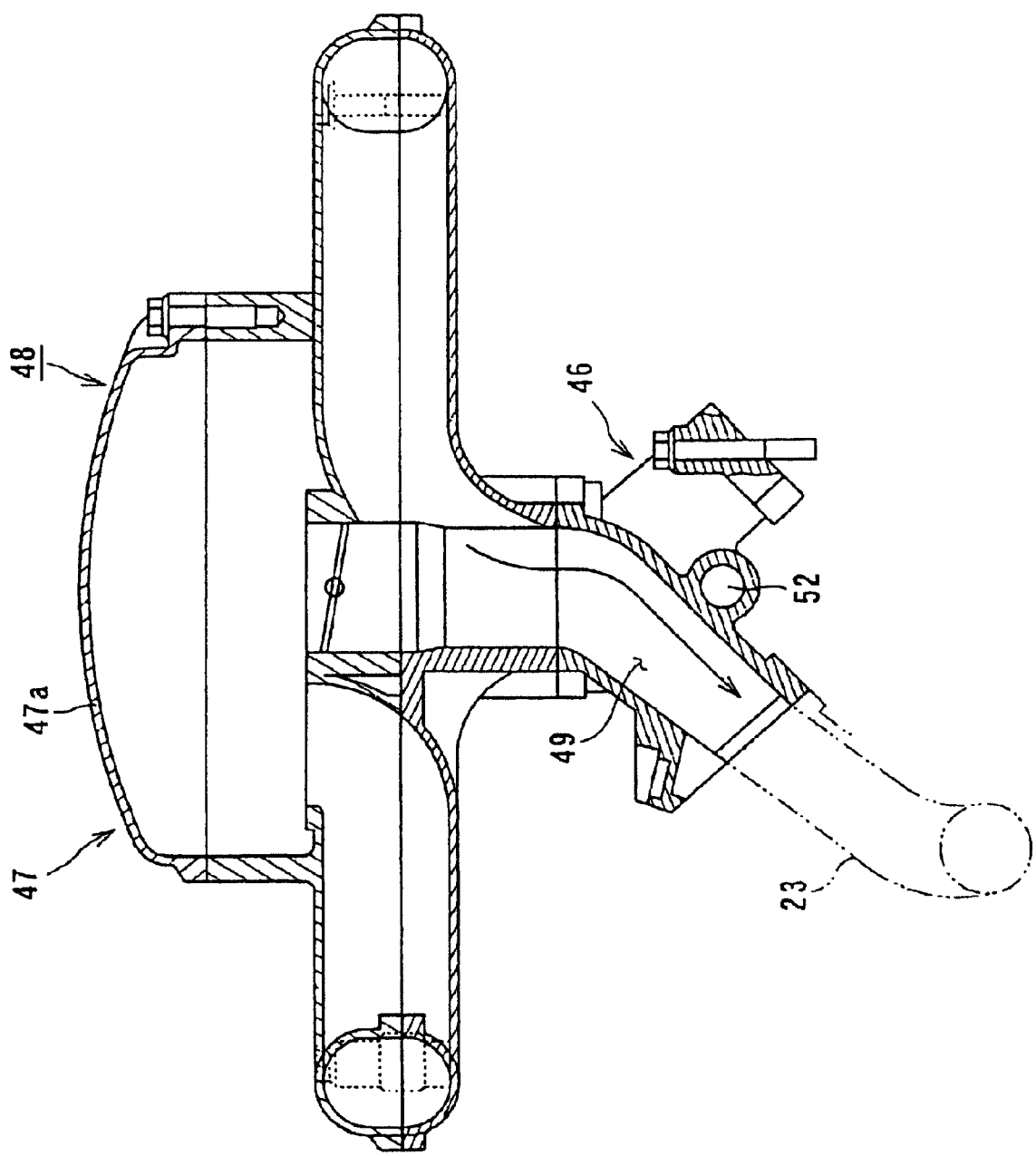
FIG. 5 is an enlarged cross sectional view of a surge tank and intake manifold used in an embodiment of the intake cooling system of the invention.

FIG. 5 is an enlarged cross-sectional view of surge-tank 47 and intake manifold 46, and shows one embodiment of the present invention. As shown in FIG. 5, intake passageways 49 are curved towards the intake ports 23 of the left and right cylinder heads 14, opposite from each other, and formed roughly in a V-shape. A third water-cooling passageway 52, for cooling the intake manifold 46, is integrally positioned into this V-shaped valley.

As shown in FIG. 4, a water-cooling intake hole 54, exclusively for the intake manifold 46, is positioned near an oil passageway 53; the oil passageway 53 linking oil pump 38 and oil filter 39, below the cylinder blocks 15. Water-cooling intake hole 54 is connected to a split water-cooling passageway 55 (shown in FIG. 1), where the second water-cooling passageway 45, positioned inside the cylinder holder 2, is split into two branches. A fourth water-cooling passageway 56 is extended from the water-cooling intake hole 54 to the outside of the cylinder blocks 15, along the oil passageway 53, and a water-cooling hose 58 is connected to a water-cooling outlet 57 of this fourth water-cooling passageway 56.

As shown in FIG. 3, the other end of the water-cooling hose 58, with one end connected to the water-cooling outlet 57 of the fourth water-cooling passageway 56, is connected to a water-cooling inlet 59 of the third water-cooling passageway 52, positioned at the lower end of the third water-cooling passageway 52, for cooling the intake manifold 46. Moreover, as shown in FIGS. 2 and 3, a water sleeve 60, for cooling the main oil reservoir 40, is positioned next to the main oil reservoir 40 (e.g., at the rear of the main oil reservoir 40), and the other end of a water-cooling hose 62 (with one end connected to the water-cooling outlet 61), positioned at the upper end of the third water-cooling passageway 52, is connected to this water sleeve 60 for cooling the main oil reservoir 40.

Figure 6:
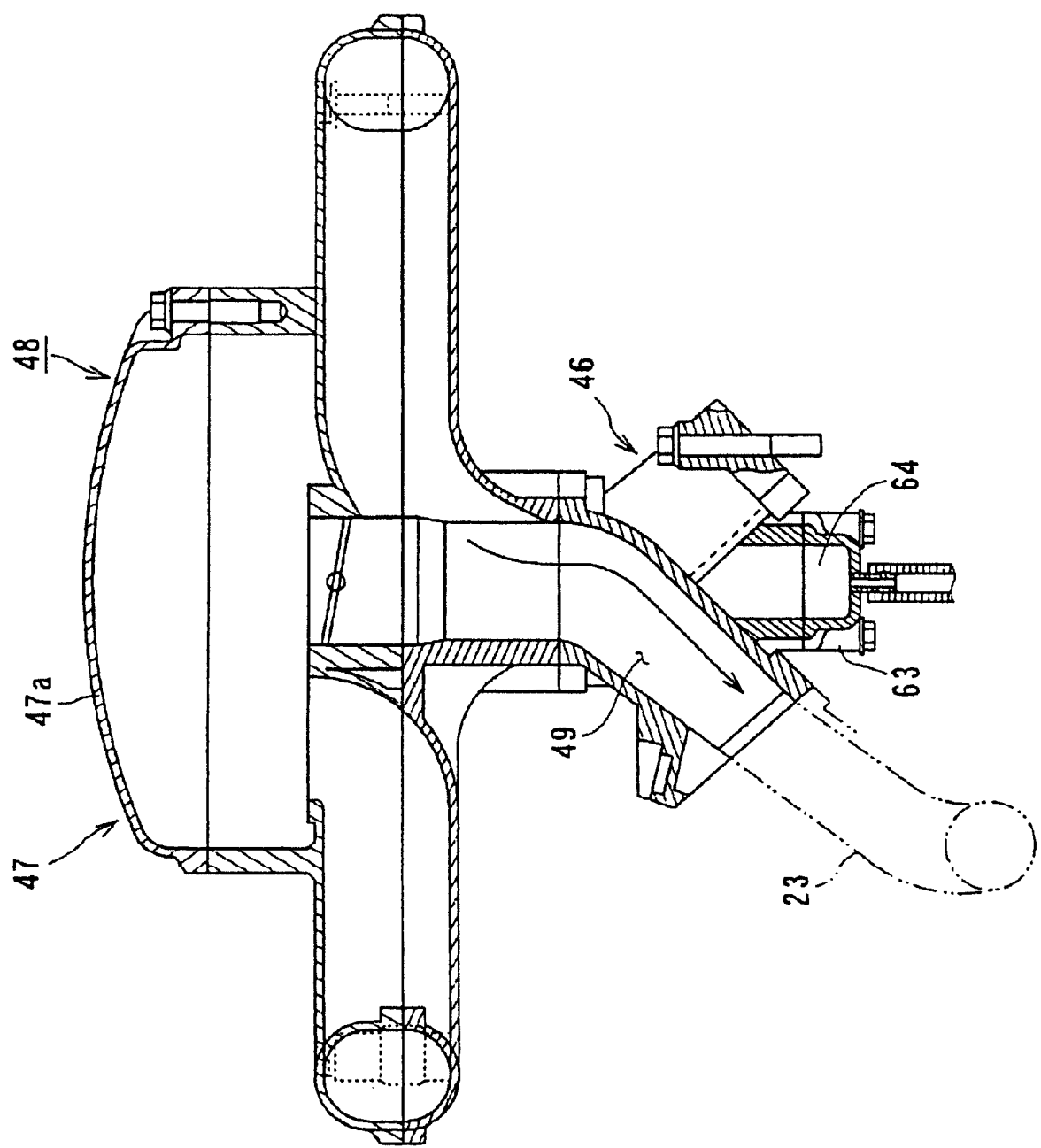
FIG. 6 is an enlarged top sectional view of a surge tank and intake manifold used in an embodiment of the intake cooling system of the invention.

The example in which the third water-cooling passageway 52, for cooling the intake manifold 46, is integrally connected to the intake manifold 46 is only one embodiment of this invention. FIG. 6 shows a second embodiment of the invention. In FIG. 6, a cover element 63, separated from the intake manifold 46, may also be positioned in the V-shaped valley to form a fifth water-cooling passageway 64 for cooling intake manifold 46.

When the engine 3 is idling, or the outside air temperature is low, the intake manifold is cooled and the intake temperature in the intake passageways 49 becomes too low, thus creating a possibility of deteriorating the fuel atomization injected by the fuel injectors 50. Accordingly, a further embodiment of this invention includes a thermostat 65 (FIG. 4), equipped with a temperature-sensitive part (not illustrated). Thermostat 65 is positioned along the path of the fourth water-cooling passageway 56, extending from the water-cooling intake hole 54, below the cylinder blocks 15, to the water-cooling outlet 57, along the oil passageway 53. In this embodiment, the water does not flow to the third water-cooling passageway 52 of the intake manifold 46 until the lubricating oil reaches a predetermined temperature, as measured by thermostat 65.

In this thermostat embodiment, the parts in outboard motor 1 are densely arranged and the entire unit is covered by an engine cover 7, thereby making the temperature inside the engine cover 7 extremely high, due to the heat generated by the engine 3. However, the lower the temperature of the intake air supplied to the engine 3, the more the intake filling efficiency will be improved, and the output of engine 3 will be increased. Thus, it is feared that the temperature of intake air will increase, due to the aforementioned reasons. Accordingly, this embodiment of the invention reduces the temperature of the intake air by positioning the third water-cooling passageway 52, for cooling the intake manifold 46, in such a way as to lead the water to cool the intake manifold 46.

In this thermostat embodiment, the intake air, passing through the intake passageways 49 positioned in the intake manifold 46, is cooled by drawing water up from the intake hole 42 with the water pump, and drawing additional water up to the engine 3 via the first water-cooling passageway 44 positioned inside the oil pan 5 and the second water-cooling passageway 45 positioned inside the engine holder 2, and then leading it to the third water-cooling passageway 52, via the water-cooling hose 58, to cool the intake manifold 46. Since intake passageways 49 are bent to intake port 23 of the left and right cylinder heads 14, differently from each other, the intake air hits the inner surface of this bending part with great force. Accordingly, cooling efficiency is improved if the third water-cooling passageway 52 (or the fifth water-cooling passageway 64), for cooling the intake manifold 46, is positioned in the roughly V-shaped valley formed by bending the intake passageways 49, opposite from each other. This third water-cooling passageway 52 is exclusively used for the intake manifold 46, which draws water up from the split water-cooling path 55, where the second water-cooling passageway 45, positioned inside the engine holder 2 is split. Accordingly, fresh and low-temperature water-cooling can always be obtained.

Similarly, the water that has cooled the intake manifold 46 is led to the water-cooling sleeve 60 of the main oil reservoir 40 and cools the lubricating oil in the main oil reservoir 40. Moreover, the intake air is not cooled until the lubricating oil temperature reaches a predetermined value. Thus, by placing thermostat 65 upstream of water-cooling passageway 52, along the path to the fourth water-cooling passageway 56 extending from the water-cooling intake hole 54, the fuel atomization is not deteriorated. Furthermore, the lubricating oil in the main oil reservoir 40 is not pre-cooled because the water is not led to the water-cooling sleeve 60 of the main oil reservoir 40 until needed. Thus, the lubricating oil is quickly adjusted to the proper temperature. Furthermore, by positioning thermostat 65 upstream of water-cooling passageway 56, no pipes or other connectors for positioning thermostat 65 are needed. In addition, the system is simplified by positioning the water-cooling intake hole 54, exclusively for the intake manifold 46, near the oil passageway 53 linking the main oil reservoir 40 and the oil filter 39 below cylinder blocks 15, and positioning the fourth water-cooling passageway 56, extending from the water-cooling intake hole 54, along the oil passageway 53.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An air intake cooling system for an outboard motor equipped with a V-type engine comprising:

an air intake manifold;

a water-cooling passageway positioned in the air intake manifold for circulating cooling water to cool air in the air intake manifold; and a water sleeve for cooling a main oil reservoir containing lubricating oil and located inside the V-type engine, the water sleeve positioned next to the main oil reservoir and connected to the water-cooling passageway, whereby the cooling water circulated in the water-cooling passageway is circulated through the water sleeve for cooling both the air in the air intake manifold and a lubricating oil in the main oil reservoir.

2. The air intake cooling system of claim 1 further comprising:

an intake manifold thermostat positioned upstream of the water-cooling passageway, the intake manifold thermostat opening and closing the water-cooling passageway according to a lubricating oil temperature and prohibiting the passage of water into the water-cooling passageway until the lubricating oil reaches a predetermined temperature.

3. An air intake cooling system for an outboard motor equipped with a V-type engine comprising:

an air intake manifold;

intake passageways positioned in the intake manifold;

a water-cooling passageway for circulating cooling water to cool air in the air intake manifold, the water-cooling passageway arranged roughly in a V-shaped valley, formed by bending the intake passageways away from each other and towards left and right cylinder heads located in the V-type engine; and a water sleeve for cooling a main oil reservoir containing a lubricating oil and located inside the V-type engine, the water sleeve formed in a valley of a V-bank, the V-bank formed by cylinder blocks positioned roughly in a V formation inside the V-type engine, the water sleeve further positioned next to the main oil reservoir, whereby the cooling water circulated in the water-cooling passageway is circulated through the water sleeve for cooling both the air in the air intake manifold and a lubricating oil in the main oil reservoir.

4. The air intake cooling system of claim 3 further comprising an intake manifold thermostat positioned upstream of the water-cooling passageway, the intake manifold thermostat opening and closing the water-cooling passageway according to a lubricating oil temperature and prohibiting the passage of water into the water-cooling passageway until the lubricating oil reaches a predetermined temperature.

5. The air intake cooling system of claim 4 further comprising an oil filter positioned upstream of the main oil reservoir, wherein the thermostat is further positioned between the main oil reservoir and the oil filter.

6. The air intake cooling system of claim 5 further comprising a water-cooling intake hole positioned near an oil passageway linking the main oil reservoir and the oil filter, and wherein the water-cooling passageway extends from the water-cooling intake hole and is positioned along an oil passageway that links the main oil reservoir and the oil filter.

* * * * *